E. KESSLER.
MACHINE FOR MEASURING AND MARKING WEBS OF FABRIC, PAPER, AND THE LIKE.
APPLICATION FILED OCT. 28, 1912.
1,095,160.
Patented Apr. 28, 1914.
7 SHEETS—SHEET 1.
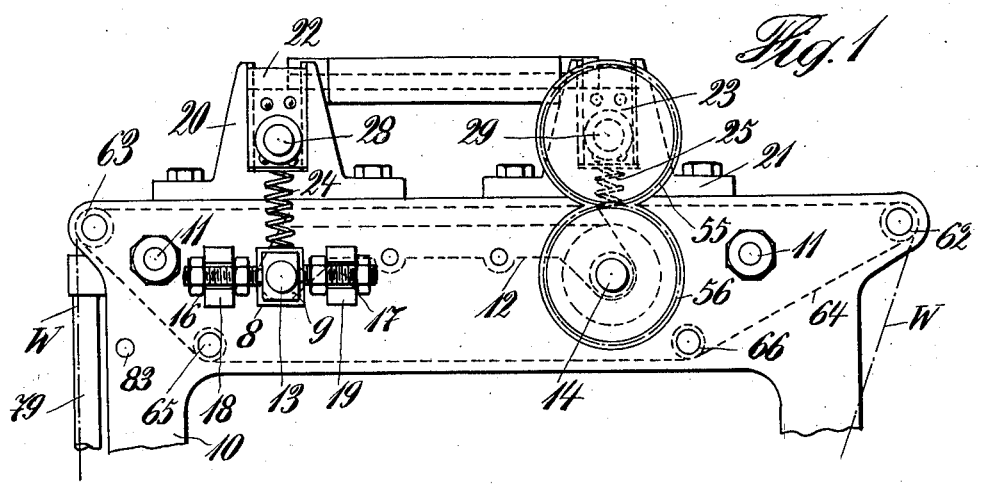
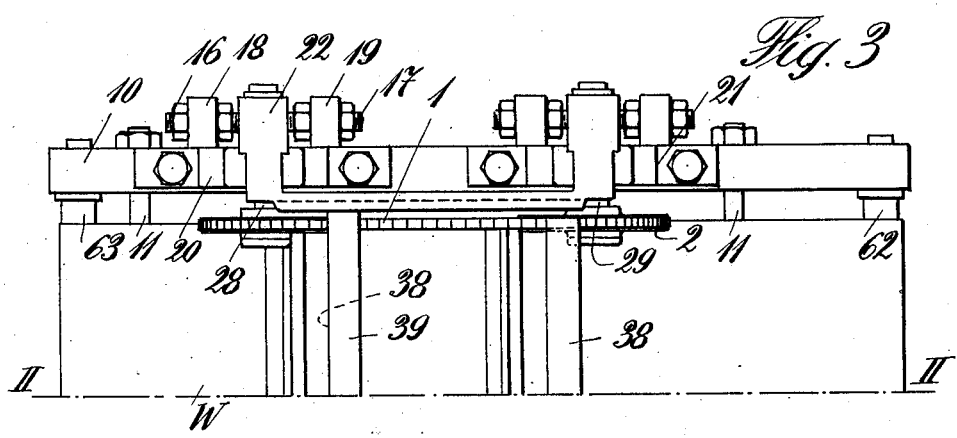
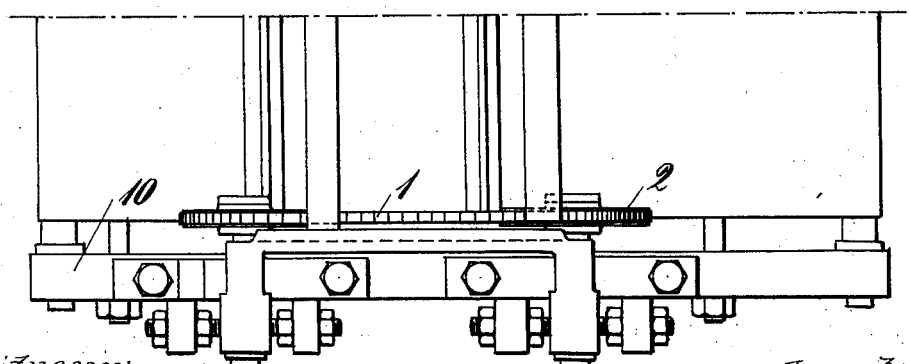
Witnesses:
Irene Forrest
Anatol Gallas
Inventor,
Ernst Kessler,
By Glenn S. Noble
Atty.

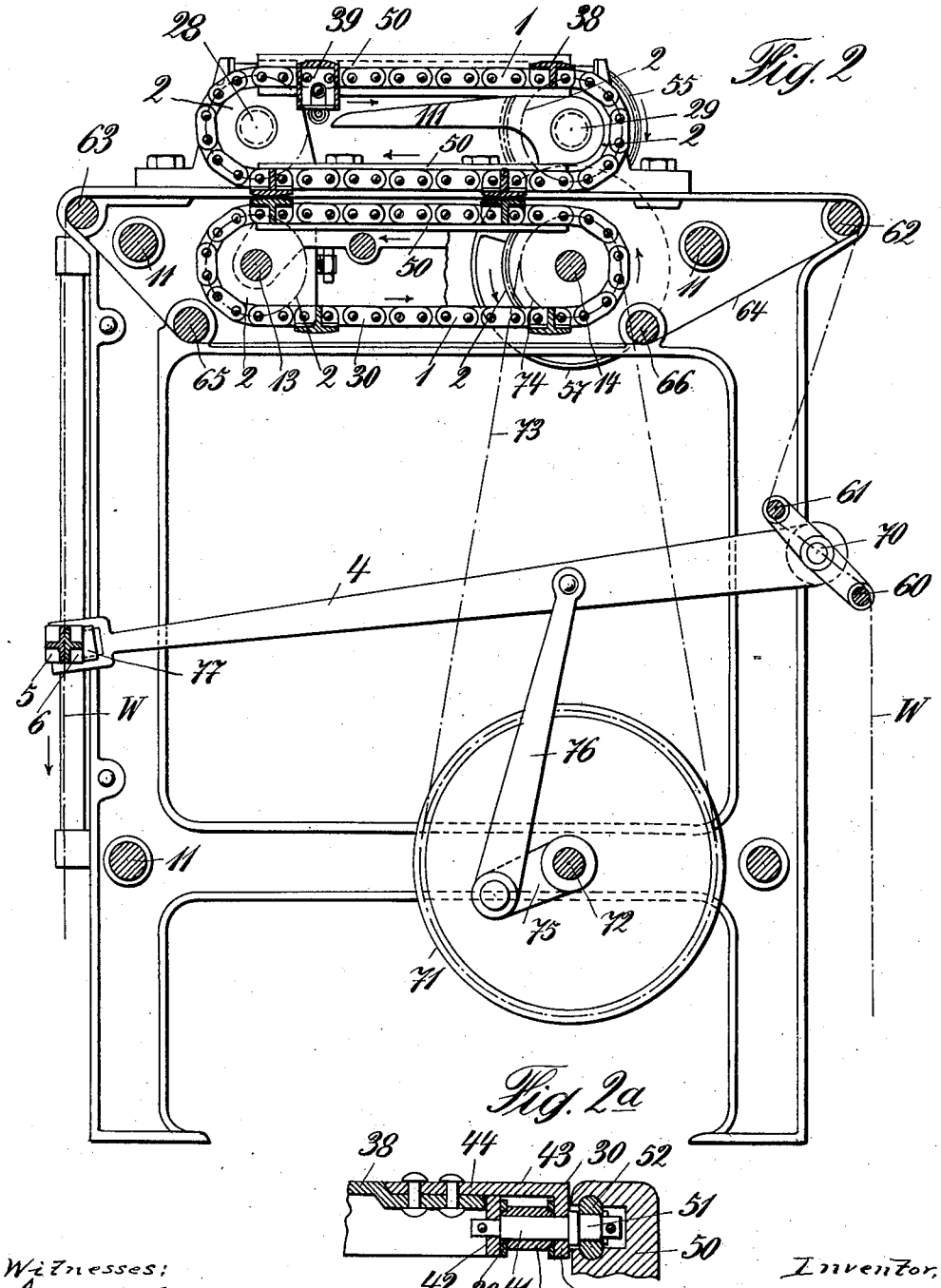

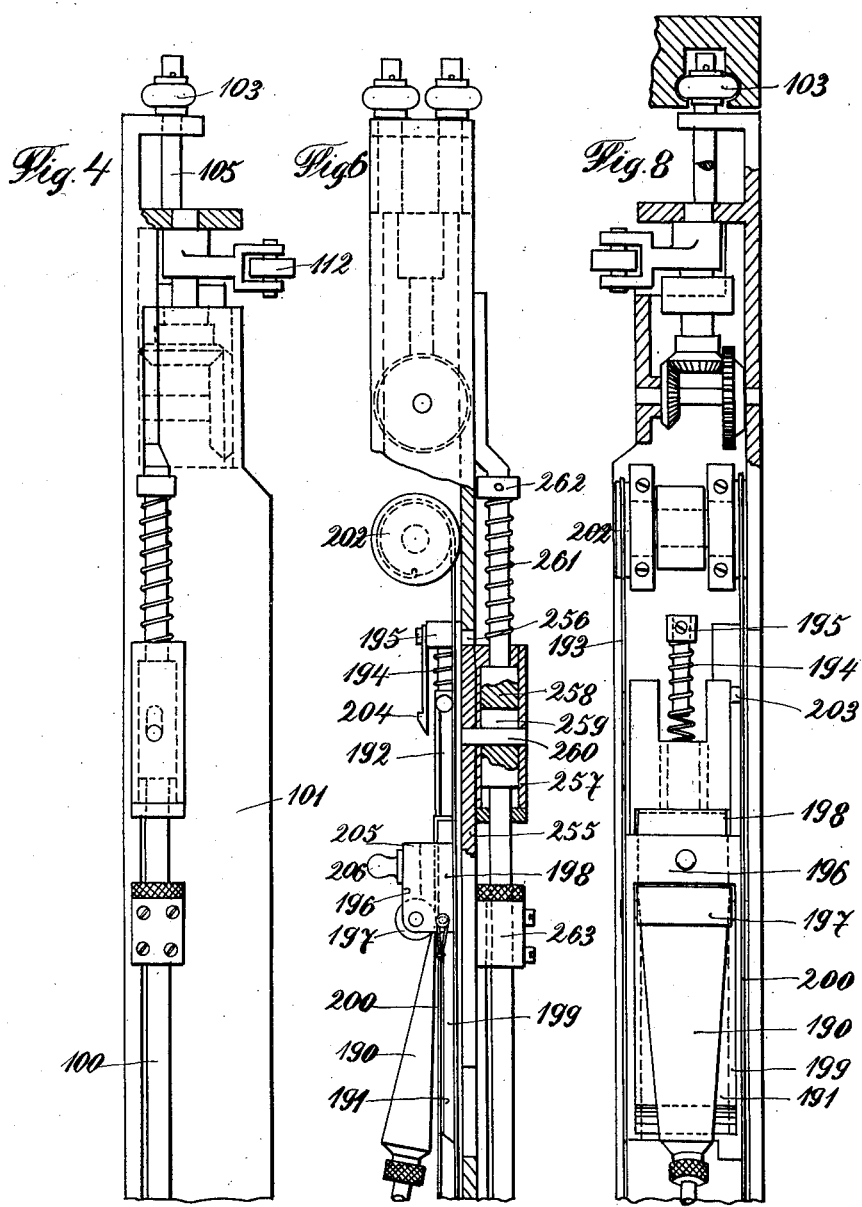

E. KESSLER.
MACHINE FOR MEASURING AND MARKING WEBS OF FABRIC, PAPER, AND THE LIKE.
APPLICATION FILED OCT. 28, 1912.
1,095,160.
Patented Apr. 28, 1914.
7 SHEETS—SHEET 4.
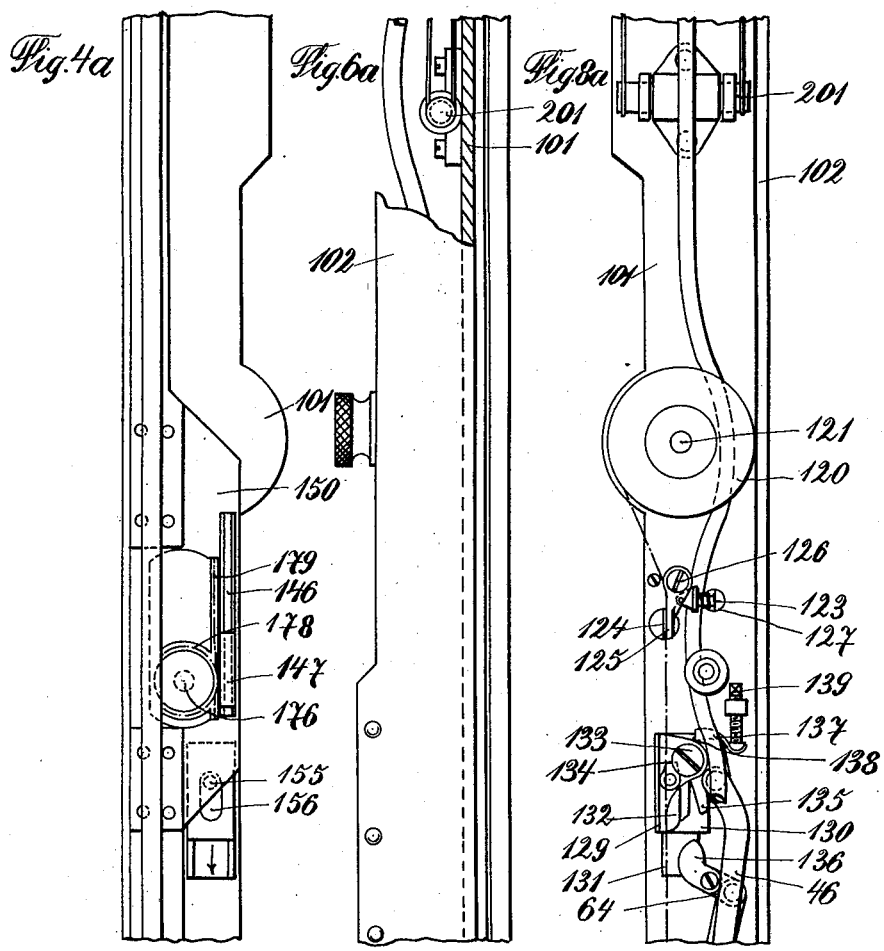

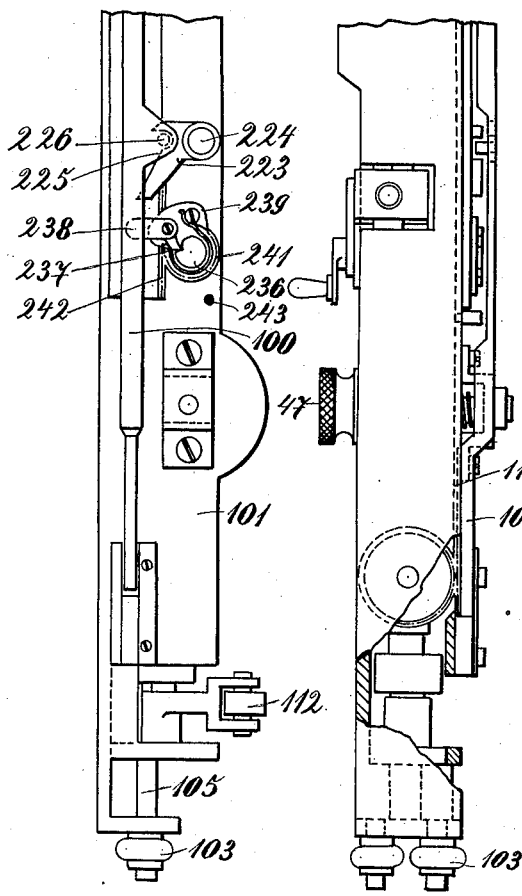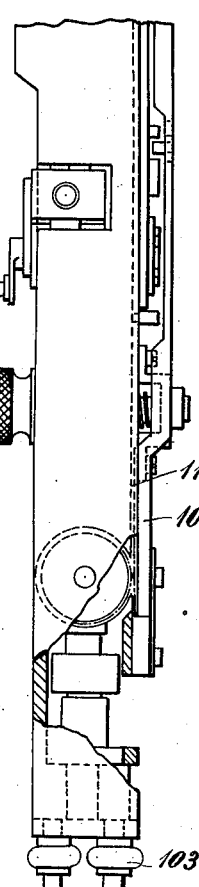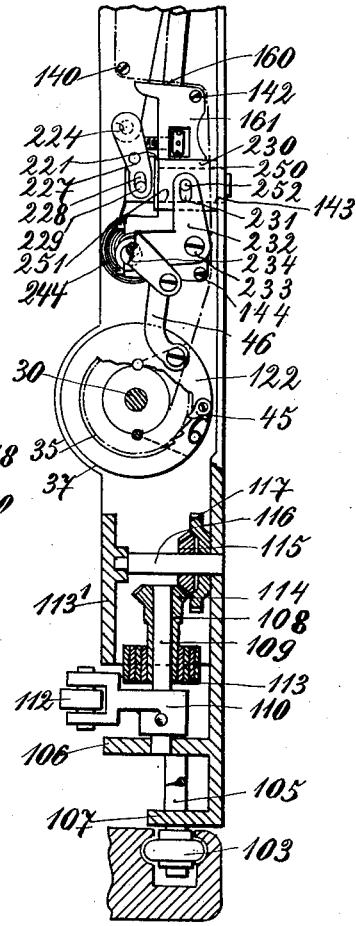

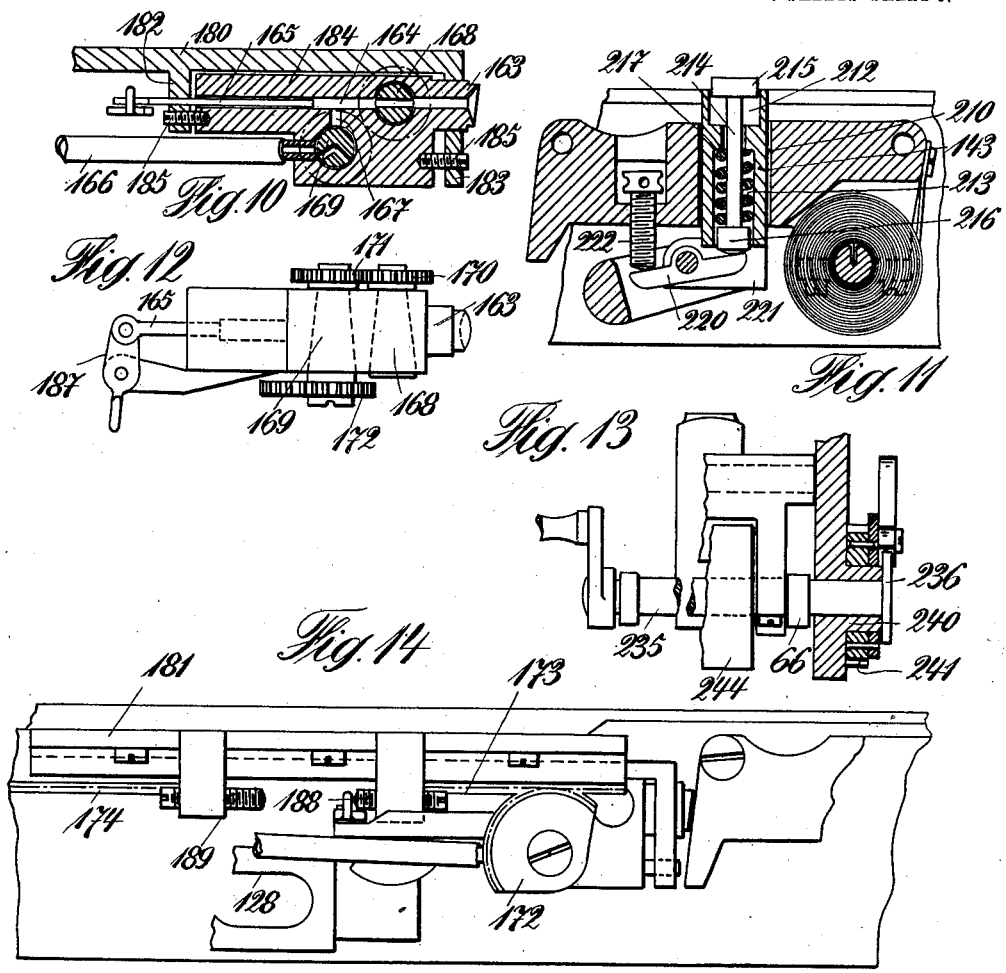

E. KESSLER.
MACHINE FOR MEASURING AND MARKING WEBS OF FABRIC, PAPER, AND THE LIKE.
APPLICATION FILED OCT. 28, 1912.

1,095,160.

Patented Apr. 28, 1914.
7 SHEETS—SHEET 7.

Witnesses:
Irene Forrest
Anatol Gollos

Inventor
Ernst Kessler
By Glenn S. Noble.
Atty.

COLUMBIA PLANOGRAPH CO., WASHINGTON, D. C.

UNITED STATES PATENT OFFICE.

ERNST KESSLER, OF CHEMNITZ, GERMANY.

MACHINE FOR MEASURING AND MARKING WEBS OF FABRIC, PAPER, AND THE LIKE.

1,095,160.

Specification of Letters Patent.

Patented Apr. 28, 1914.

Original application filed September 5, 1911, Serial No. 647,631. Divided and this application filed October 28, 1912. Serial No. 728,261.

*To all whom it may concern:*

Be it known that I, ERNST KESSLER, a citizen of the German Empire, residing at Chemnitz, in the Kingdom of Saxony, Germany, have invented certain new and useful Improvements in Machines for Measuring and Marking Webs of Fabric, Paper, and the like; and I do hereby declare the following to be a full, clear, and exact description of the invention, such as will enable others skilled in the art to which it appertains to make and use the same.

My invention relates to improvements in machines for measuring and marking webs of fabric, paper and the like, and more particularly to that class of machines in which the web is fed to a measuring device and receives a mark or impression such as described in my application Serial No. 647,631, filed Sept. 5, 1911, of which this is a division, and one of the objects of the improvements is to provide a machine in which the web feeding device exerts a uniform and continuously acting tension on the web, so that absolutely accurate measurements may be made and marked on the web.

With this and other objects in view my invention consists in so constructing the web feeding device, that constant and continuously acting tension is exerted on the web fed toward the measuring device.

My invention also relates to certain improvements in the measuring or marking device such as will be explained hereinafter and particularly pointed out in the appended claims.

For the purpose of explaining the invention an example embodying the same has been shown in the accompanying drawings in which the same letters of reference have been used in all the views to indicate corresponding parts.

Figure 16:
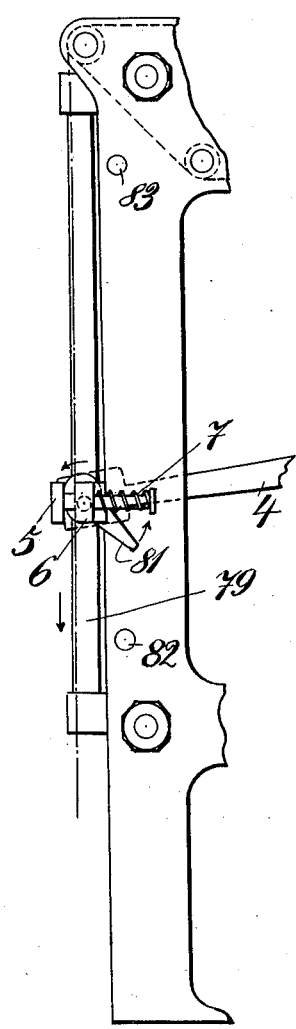
Figure 17:
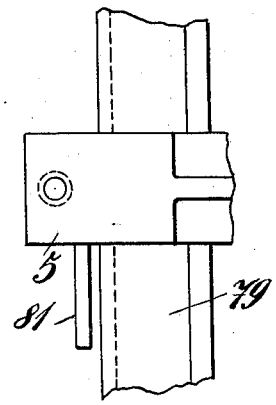
Figure 18:
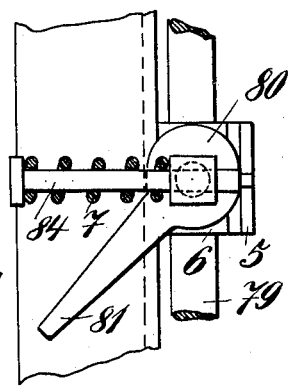
Figure 19:
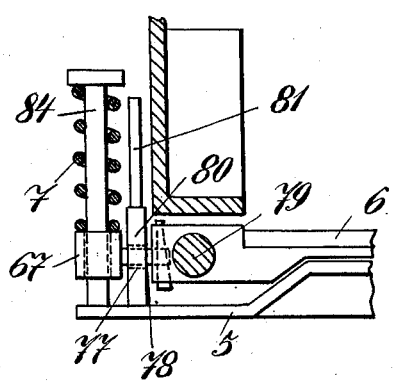

In said drawings—Figure 1 is a side view of the upper part of the machine; Fig. 2 is a vertical cross section through the machine on the line 11—11 in Fig. 3. Fig. 2ᵃ is an enlarged vertical section through one end of the conveying chains. Fig. 3 is a plan of the machine with the center broken away. Figs. 4, 4ᵃ and 5 give together a side view of the clamping bar. Figs. 6, 6ᵃ and 7 show a plan of the clamping bar, with parts cut away. Figs. 8, 8ᵃ and 9 give a side view of the clamping bar, opposite to that shown in Figs. 4 and 5. Fig. 10 is a longitudinal section of the gluing apparatus on an enlarged scale. Fig. 11 is the marking apparatus coöperating with said gluing apparatus, shown on the same enlarged scale. Fig. 12 is a plan of the parts shown in Fig. 10. Figs. 13 to 15 are details of the clamping bar. Fig. 16 is an elevation of the left hand part of the machine frame, and Figs. 17 to 19 are details of the clamping device.

Referring to the example illustrated in the drawings my improved machine consists of an apparatus for marking a web of fabric, paper or the like, means for feeding uniform lengths of a web of fabric, paper or the like to said marking apparatus, and a device for firmly affixing the mark attached to the web of fabric. As shown the means for feeding uniform lengths of fabric consist of two parallel stretches of endless traveling tape each constructed in the example shown of a pair of endless chains 1 guided on sprocket wheels 2 and connected by transverse clamping bars 38. The marking device is located within one of the said transverse clamping bars of the upper endless chain which has been indicated by the numeral 39, and which is constructed in a particular way as will be explained hereinafter, and it comprises a device for punching a mark from a web of paper or the like and attaching the same to the web of fabric, feeding means for supplying said web of marking paper to the punching device, and means for applying a liquid such as glue to the web of marking paper. The device for affixing the mark attached to the fabric to the latter consists of a rocking lever 4 carrying at its end a clamping device composed of jaws 5 and 6 a spring 7.

In describing the invention reference will be had to a machine composed of the aforesaid elements. But I wish it to be understood, that my invention is not limited to the construction shown, and that various changes may be made in the general arrangement and construction of the parts and that some of said elements may be omitted or substituted by others.

As shown the operative parts of the machine are mounted on a bed which consists of two side frames 10 suitably braced relatively to each other by transverse bars 11. In the upper part of the side frames a pair of lower shafts 13 and 14 are mounted. As shown the bearing of the right hand shaft 14 is stationary relatively to the machine frame, while the bearing of the left hand shaft 13 permits of a slight adjustment relatively to the bearing of the shaft 14 by means of a pair of set screws 16 and 17 engaging a bushing 9 and working in suitable blocks 18 and 19. As shown the bushing extends through a hole made in the side frame and it is slidably mounted on a guide plate 8. On the top of each of the side frames, a pair of bearings 20 and 21 are secured which are formed with vertical slots within which bearing blocks 22 and 23 are supported on coiled springs 24 and 25 resting with their lower end respectively on the bushing 9 and lug 15 projecting from the side frames 10. In the bearings 22 and 23 the upper shafts 28 and 29 are mounted. To opposite ends of the shafts 13, 14, 28 and 29 the sprocket wheels 2 are secured. About corresponding sprocket wheels the chains 1 are trained, and the pair of upper or lower chains are connected at suitable points of their lengths by transverse clamping bars 38 which are so arranged that corresponding bars of the upper and lower chains contact with each other during their travel through the adjacent stretches of the chains. The construction of the transverse bars 38 will most clearly be understood from an inspection of Fig. 2ª. As shown the chains consist of links 30 jointed at their ends to sleeves 40 located on bolts 41. Where the chains are provided with transverse bars, pairs of links 42 are connected at their upper ends by a bridge 43 having an extension 44 (Fig. 2ª). To the said extensions the transverse clamping bars 38 are riveted or otherwise secured. As shown the adjacent or inner stretches of the upper and lower chains and the upper stretches of the upper chains are guided at their outer sides in guide ways 50. The bolts 41 to which the transverse clamping bars 38 are secured are provided at their outer ends with journals 51 on which the rollers 52 are mounted which run in the guide ways 50 (Figs. 2, 2ª). The object of the guide way 50 for the adjacent stretches of the chains is to exert a clamping action on the transverse bars when traveling in contact with each other, so that the web of fabric fed by the apparatus is securely held between the pairs of transverse bars. The object of the upper guide ways is to provide an abutment for the marking device during its travel through the upper stretch, as will be explained hereinafter. Rotation is imparted to the sprocket wheels in the following way: At one of their ends the shafts 14 and 29 carry spur gears 55, 56 (Fig. 1) of even diameter and in mesh with each other. To the lower shaft 14 a belt pulley 57 (Fig. 2) is secured by means of which rotary movement may be imparted to the operative parts of the machine from any suitable source of energy. By means of the gears 55 and 56 the rotation of the shaft 14 is transmitted to the shaft 29 in such a way, that the circumferential speed of the sprocket wheels 2 is the same, and the chains travel at the same speed. The tension of the chains may be adjusted by adjusting the lower bearing block 9.

The web of fabric which is to be marked by my improved machine has been indicated by the letter W (Figs. 1, 2). It is trained over shafts 60, 61, 62 and 63 and over an endless traveling tape 64 trained on shafts 62, 63, 65, and 66. The web feeding apparatus is located between the shafts 62 and 63. As shown, the distance between the transverse clamping bars 38 and the distance of the combined clamping and marking bar 39 from the adjacent bars 38 is such, that at least one of the pairs of bars is always in clamping engagement with the web. Therefore, if a pair of clamping bars is in engagement with the web, it imparts thereto a certain tension, and while the web is still under such tension the succeeding pair of clamping bars is brought into engagement with the web, so that the web will continue its travel with uniform speed and without at any time changing its tension. Therefore the lengths of fabric which are fed by each complete path of the marking device are accurately the same. In the example illustrated in the drawings, the marking device is located within one of the transverse bars, this particular clamping bar having received the numeral 39, and the said marking device applies a mark to the web in the manner to be described hereinafter, the mark being afterward pressed or affixed to the web. From the feeding apparatus the web is fed to an apparatus for affixing the mark thereto, and the said apparatus consists of a pair of clamping bars 5 and 6 mounted on a pair of rocking levers 4 (Fig. 2). The said rocking levers are fulcrumed at 70. Below the rocking levers 4 a sprocket wheel 71 is mounted on a shaft 72 having bearing support on a suitable part of the machine frame. The said sprocket wheel is connected through a chain 73 with a sprocket wheel 74 secured to the shaft 14 from which it receives rotary motion. The shaft 72 is provided with a pair of cranks 75 connected by links 76 with the rocking levers 4. The rocking levers 4 have forked ends within which they receive slide blocks 77 (Fig. 2). Within bores of the latter, pivots 78 (Fig. 19) of the clamping bar 6 are journaled, and the said bar is guided on vertical bars 79 (Figs. 16 to 19) adapted to hold the same with its clamping face in vertical position, while the slide blocks are slightly rocked by the rocking movement of the levers 4. Through horizontal bushings 67 provided at the ends of the clamping bar 6 there extend spring actuated bolts 84 which are secured to the clamping bar 5 coöperating with the bar 6 to clamp the web of fabric. Cam disks 80 having fingers 81 have a rocking support on the bar 6. These fingers 81 are adapted to strike upper or lower studs 82 or 83 secured to the machine frame to cause the cams to engage the bar 5.

In the operation of the parts of the machine so far described, rotation is imparted to the sprocket wheels 2 whereby a web of fabric W is passed between the transverse clamping bars of the chains 1 while a mark is attached thereto at uniform intervals. The web arrives with the mark attached thereto into position for engagement by the clamping bars 5 and 6 near the end of the upward movement of the latter and while the said jaws are separated from each other by the cams 80. The moment the mark is between the said clamping bars the fingers 81 of the cams strike against the upper studs 83 so that the cams are rocked into inoperative position in which the springs 7 are free to force the bar 6 with their clamping faces on the clamping bar 5. In the preferred form of the apparatus such clamping action begins slightly before the rocking lever arrives at the end of its upward stroke, so that the part of the web which is between the clamping device and the feeding apparatus is held slack during the following downward stroke of the levers 4 and the latter are not able to exert any stress on the web which would add to the tension imparted thereto by the clamping bars 38 and 39 and cause an inaccuracy in the advance of the web and therefore inaccurate marking. By the clamping action of the clamping bars 5 and 6 the mark is securely affixed to the web. Near the end of its downward stroke the rocking levers 4 strike with the fingers 81 of the cams on the lower studs 82 whereby the said cams are rocked into releasing position in which they force the bar 6 away from the clamping bar 5.

In describing the apparatus for punching a mark from a web of paper or the like and attaching the same to the fabric reference will be had to Figs. 5 to 14 of the drawings. The said apparatus comprises various mechanisms as folows: An apparatus for feeding a web of paper or other suitable material from which the marks to be applied to the fabric are punched. Second, a punching device for cutting a mark from the said web of paper or other suitable material and applying the same to the fabric. Third, a device for clamping the web of paper on the punch while punching a mark therefrom. And fourth, an apparatus for applying a liquid such as glue to the mark which in the example shown comprises a tube containing the liquid, means in the form of a pressing roller to press the liquid from the said tube, a plunger for forcing the liquid out upon the web of paper, and a pair of cock valves for controlling the supply of the liquid to the web of paper. All of the said mechanism are driven from a rod 100 extending longitudinally of the transverse bar 39. In the example shown the transverse bar 39 inclosing the mechanisms for applying a mark to the fabric has a substantially angular cross-section, and within the angle formed by a vertical flange 101 (Fig. 9) and the horizontal flange 102 all the operating mechanisms are located, while most of the driving means including the rod 100 are disposed on the outside of the vertical flange. At its ends the transverse bar is supported on pairs of rollers 103 mounted on shafts 105 secured to flanges 106 and 107 depending from the horizontal flange 102 of the transverse bar 39. On the inner flange 106 and on lugs 108 projecting from the vertical flange 101 a rock shaft 109 is mounted. At one end an arm 110 is secured to the said shaft which in its lower forked end is provided with an antifriction roller 112 adapted to ride on an inclined guide arm 111 (Fig. 2) secured to, or made integral with the upper guide 50 which, as has been explained above, provided a suitable guide for the transverse clamping bars 38 and 39. In the travel of the transverse bars 39, 38 the anti-friction roller 112 strikes against the said inclined guide way 111 and it rides up the same so as to rock the arm 110 and the shaft 109. As appears from Fig. 2, the inclined portion of the guide arm is followed by a substantially semi-circular portion the operative surface of which remains at a constant distance away from the clamping bars, and the said equidistant part extends to the point of the path of the clamping bars 38, 39 at which punching and applying of the mark is effected. When the anti-friction roller leaves the guide 111, the shaft 109 is rocked backward into normal position by a coiled spring 113 (Fig. 9) secured from one end to the rock shaft and with the opposite end to a relatively stationary portion of the clamping bar. The said rocking movements are transmitted to the various marking devices arranged on the transverse bar 39. For this purpose the rock shaft 109 carries at its inner end a bevel gear 114 which is in mesh with a bevel gear 115 loosely mounted on a bolt 116 secured with its upper end in the horizontal flange of the transverse bar and with its lower end in a lateral projection 113′ of the vertical flange. To the hub of the bevel gear 115 a spur gear 117 is secured which is in mesh with teeth 118 provided on the longitudinal rod 100 (Fig. 7). In the preferred form of the invention a similar mechanism is provided at the opposite end of the transverse bar 39 and the longitudinal rod 100 extends to the opposite end of the latter.

The marking paper is taken from a rolled web 120 (Fig. 9) of the same which is provided on a horizontal shaft 121, and the paper, from which the marks have been punched is adapted to be wound up on a drum 122 by mechanism described hereinafter. In its passage from the supplying roll the web of paper is put under the desired tension by means of a spring actuated clamping device which consists of a stud 124 projecting from the vertical flange 101, a rocking jaw 125 mounted on a pivot bolt 126 secured to the flange 101, and a spring actuated push rod 123 jointed to the rocking jaw 125 and guided at its upper end in a bore of a stud 127. From the said clamping device the web passes through a suitable feeding device which in the example illustrated consists of a slide 130, having reciprocating movement on a guide way 131 formed on the flange 101 and formed with a laterally projecting clamping plate 129, and of a clamping jaw 132 having rocking support on a pivot 133 secured to the said slide and normally pressed in contact with the plate 129 and with the web of marking material pressed thereon by means of a spring 134 coiled about the pivot 133 and pressing with one end on the jaw 132 and secured with the opposite end to a relatively stationary part. The said jaw is adapted to be rocked out of clamping engagement with the web of paper by means of an arm 135 rigidly connected therewith and adapted to strike a releasing finger 136, when the slide arrives in its right hand end position, and when the jaw is thus rocked it is locked by a pawl 137 engaging a shoulder 138 formed on the hub of the clamping jaw 132. Now the slide 130 can be returned into its left hand position without acting on the web of paper, and when in its left hand end position the pawl 137 strikes against a screw 139, so that it is thrown out of engagement with the clamping jaw 132, and the latter is free to engage the web and to advance the same upon the following movement of the slide 130 to the right.

The apparatus for imparting reciprocating movement to the slide 130 is operated from the rod 100 (Fig. 7) which for this purpose is connected to a slide 150 (Fig. 5) mounted for reciprocation on the outer side of the vertical flange 101 of the bar 39. The slide is formed with longitudinal slots 146 engaged by guide blocks 147 secured to the vertical flange 101.

The drum 122 (Fig. 15) is loosely mounted on a shaft 30 projecting through the vertical flange 101 and secured thereto by means of a cross piece 31 and a nut 32 engaging the screw threaded end of the said shaft. On the rear end of the shaft a sleeve 33 is loosely mounted which is normally forced forward and toward the drum 122 by a spring 34. At its end adjacent to the drum 122 the said sleeve is made integral with a ratchet wheel 35 to which a friction plate 36 is secured. The latter is in frictional engagement with the drum 122 so that it is adapted to carry the same around. In the sleeve 33 a rocking member 37 (Fig. 9) is loosely mounted which carries a spring actuated pawl 45 engaging in the teeth of the ratchet wheel 35. The rocking member 37 is connected with the upper part of the paper feeding slide 130 by means of a link 46.

From the foregoing it will be understood, that upon each forward stroke of the paper feeding slide 130 the ratchet wheel 35 is advanced a corresponding distance, and such advancing movement of the ratchet wheel is transmitted to the drum 122 through the intermediary of the friction disk 36 (Fig. 15). Upon each operation the ratchet wheel tends to advance the drum 122 a distance exceeding that of the feeding slide 130, and this distance will be increased as the diameter of the paper rolled on the drum is increased. However, by reason of the frictional engagement between the friction plate 36 and the drum 122 the latter can wind up only so much paper as is supplied by the feeding device, and no excessive tension can be exerted on the web of paper. This tension depends on the tension of the spring 34. To the shaft 30 a handle 47 is secured by means of which the web of paper can be wound upon or unwound from the drum by hand.

The finger 136 (Fig. 9) by means of which the paper clamping jaw 132 is rocked into releasing position is formed at the lower end of a rocking lever 64 which at its upper end is joined to a link 65. The latter is engaged at its opposite end by a cam 66 of a rock shaft 235 operated by mechanism described hereinafter. From the said shaft the finger 136 is moved in such a way, that at the end of the feeding stroke of the slide 130 it is below the arm 135 and moves upward and into engagement with the said arm, so as to shift the same into releasing position.

From the paper feeding apparatus the web passes over a stud 140 and from the latter it extends upward and over the surface 160 of a block 161, and from the latter over a stud 142, the punch 143 for separating a mark therefrom, over a stud 144, and over the roll 122.

To the slide 150 (Fig. 5) a pin 155 is secured which extends through a slot 156 of the vertical flange of the bar 39 and into an elongated slot 128 provided in the slide 130, so that the latter takes part in the reciprocations of the rod. However, by reason of the slot 128 the slide 130 has a certain play relatively to the slide 150 and the rod 100 and the latter begin their strokes in either direction in advance of the slide 130. This is advisable, because thereby the paper is released by the clamping arm 132 by means of the finger 136, before the return stroke of the slide 130 begins, and on the other hand the paper feed does not begin before the punch 143 has been retracted from the paper and the clamp 250 has released the web of paper, as will be explained hereafter.

The marking of the web of fabric or the like is effected by means of a mark which is punched from the web of paper 120. The said web of paper shows at the proper distance from one another numbers which when attached to the fabric indicate the length of the latter. As shown the said numbers are printed on the lower side of the web of paper which side is opposite to that to which the glue is applied, as will be described hereinafter. The distance of consecutive numbers corresponds to the feed of the slide 130, so that upon each feeding operation a new number is exactly set on the punch of the separating apparatus. In separating the mark, the number is on the side of the punch and the glued surface thereof on the side of the fabric, so that in the marked fabric the number is displayed.

The apparatus for applying a liquid such as glue or, in case the paper has previously been glued, water to the rear face of the paper consists of elements as follows: In applying the liquid to the paper the latter finds a support on the left hand face 160 of a block 161 (Fig. 9) projecting laterally from the vertical flange 101 and below the horizontal flange 102. On the horizontal flange 102 a longitudinally reciprocating slide 180 is supported by means of guides 181 (Figs. 10, 14) screwed to or made integral with the said flange. The slide is formed with depending flanges 182 and 185, and between the latter a block 184 is adjustable by means of set screws 185 passing through the flanges 182 and 183 respectively. At its right hand part the block 184 is provided with a gluing head 163 projecting through a hole made in the flange 183 and having its face fashioned according to the inclination of the left hand face 160 of the block 161. The block 184 is formed with a bore 164 receiving a reciprocating plunger 165 and communicating through a branch duct 167 with a hose 166 supplying a liquid such as glue. The supply of the liquid to the bore 164 in front of the plunger 165 and through the gluing head is controlled by cock valves 168 and 169. When the plunger is moving to the right, the head 163 is in contact with the paper, the cock 169 is closed, and the cock 168 is open, so that liquid is forced from the bore 164 through the head 163 and on the paper. Upon the return stroke of the plunger the head 163 releases the paper, the cock 168 is closed and the cock 169 opened, so that a fresh charge of liquid is drawn into the bore 164.

The mechainsms for operating the valve cocks 168 and 169, the plunger 165, and the block 184 consist of the following elements: The cocks 168 and 169 (Fig. 12) carry at one of their ends gear wheels 170 and 171 which are in mesh with each other, so that any rotation imparted to the cock 169 is transmitted to the cock 168. At the opposite end the cock 169 is equipped with a gear segment 172 to which rocking movement can be imparted by rack 173 formed in or secured to one of the guides 181. To the slide 180 a rack 174 is secured which is in mesh with a gear 175 secured to a shaft 176 mounted for rotation in a suitable bearing 177 of the vertical flange 101. At its opposite end the said shaft carries a spur gear 178 which is in mesh with rack teeth 179 formed on the slide 150. Therefore the slide 180 and the block 184 mounted thereon have a reciprocating movement and by such movement the gluing head 163 (Fig. 10) is alternately brought into engagement with the web of paper located on the surface 160 and removed therefrom. When the gluing head is in contact with the paper the cock valve 169 closes the duct 167, while the valve 168 establishes communication between the bore 164 and its outlet through the gluing head. Such operation of the cock valves is performed by the toothed segment 172 (Fig. 12) riding on the stationary rack 173 during the movement of the block 184. Near the end of the stroke of the latter a rocking lever 187 pivotally mounted on the block 184 strikes against a screw 188 (Fig. 14) whereby the plunger 165 (Fig. 10) connected to the opposite end of the lever is forced inward and the liquid within the bore 164 is discharged through the gluing head 163 and against the paper. Upon the return stroke of the slide 160 the position of the cocks is reversed, and near the end of the stroke the rocking lever 187 strikes against a second screw 189 so that the bore 164 can again be filled with liquid.

The liquid is supplied to the hose 166 from a tube 190 (Fig. 8) of soft metal, which is located on a plate 191 secured to the vertical flange 101 and below the horizontal flange 102. The rear end of the said tube is bent inward toward the vertical flange and it is clamped on the rear end of the plate 191 by means of a slide block 192 moving in suitable guide ways 193 and forced forward by a spring 194 which has a rear abutment on a stud 195 secured to the vertical flange 101. On the plate 191 a slide block 196 is guided which at its right hand end carries a roller 197 and which with its lateral flanges 198 engages in grooves 199 formed in the sides of the plate. The roller 197 (Fig. 6) is adapted to be forced over the tube 190 and to compress the same. The pressure required therefor is imparted to the roller by the lateral flanges 198 engaging in the grooves 199 of the plate 191. To both sides of the slide 196 a cord 200 (Figs. 6, 8) is attached which is trained on a roller 201 located at the right of the plate 191 and on spring actuated rollers 202 located at the left of the stud 195. By the construction described the tube 190 is held under constant pressure, so that the liquid is readily supply therefrom to the gluing head 163. After the tube has been emptied, the block 196 is moved back by hand, until it strikes against a pair of pins 205 projecting from both sides of the block 192. Thereby the latter is carried along against the action of the spring 194. In its extreme left hand position the slides 196 and 192 are locked by means of a spring hook 204 engaging a shoulder 205 projecting from the inner end of an operating handle 206 secured to the slide 196. Now the tube 190 can easily be removed and replaced by a filled one.

The apparatus for punching a mark from the paper and attaching the same to the web of fabric is constructed as follows: The block 161 is formed with a vertical bore 210, (Fig. 11) and within the said bore the punch 143 has reciprocating movement. The punch is formed with a longitudinal bore which at its upper and lower ends has enlarged portions 212 and 213. Within the bore of the punch a plunger 214 is movable, the enlarged head 215 of which fits in the enlarged portion 212, and the enlarged foot 216 of which fits in the enlarged lower portion 213 of the bore of the punch. A spring 217 has the tendency to retract the bolt 214 into its lower position within the punch 143, in which the head 215 is below the top of the punch. Normally the punch 143 is in its lower retracted position in which it permits the free passage of the web of paper over the same. The dimensions of the parts are such, that the portion of the web of paper which has been glued and which on its opposite face shows a number is fed exactly over the punch 143. In order to punch the glued mark out of the web, the punch 143 is forced upward, so that it cuts out the mark with its upper annular margin which is preferably sharpened. By thus being shifted upward the punch takes along the plunger 214 which however for the present is held in its retracted or inoperative position within the punch by the spring 213.

Near the upper end of the stroke of the punch 143 a rocking lever 220 pivotally mounted on an arm 221 of the punch engaging the plunger 214 with one end strikes with its opposite end against a screw 222 provided in the block 161. Thereby the said lever is rocked, and the plunger 214 is thrown upward and against the mark of paper which has before been punched out from the web by the punch 143. Thereby the said mark is pressed in contact with the fabric, so that it sufficiently adheres thereto, until it is affixed by means of the clamps 5 and 6, as has been described above.

In the example illustrated in the drawings reciprocating movement is imparted to the punch 143 from the longitudinal rod 100 (Fig. 7) when the latter is moving toward the left. A rocking member 223 (Fig. 9) is secured to a bolt 224, and is provided with a notch 225 engaged by a pin 226 secured to the rod 100. At the opposite end the bolt 224 carries a forked lever 227 which in an elongated slot 228 engages a pin 229 projecting from the arm 221.

In order to hold the web of paper rigidly in contact with the web of fabric and to prevent slipping thereof during the punching operation I prefer to provide paper clamping means as follows: At the sides of the punch 143 a clamping frame 230 has reciprocating movement. The said clamping frame is constructed in the form of a bridge 250 having a bore for the passage of the punch 143 and adapted to press the web of paper on the upper surface of the block 161 at a portion surrounding the punch 143. The bridge is provided with depending flanges 251 guided on opposite sides of the block 161 and from the said flanges pins 252 project laterally and into elongated slots 231 of bell crank levers 232 fulcrumed on the block 161 at 233. The lower arms of the bell crank levers are formed with elongated bores which are engaged by cams 234 of a rock shaft 235 (Fig. 13) mounted in the vertical flange 101. At the outer end the shaft 235 is provided with a disk 236 having a shoulder 237 adapted to be engaged by a spring actuated pawl 238. The latter is pivoted to a disk 239 loosely mounted on a stud 240 projecting from the vertical flange 101 and providing a bearing for the shaft 235. Rigidly connected with the disk 239 is a spur gear 241 which is in mesh with rack teeth 242 of the slide 150. Therefore when the slide 150 is moved to the right, the spur gear 241 and the disk 239 are rotated in the direction of the arrow shown in Fig. 5, and the pawl 238 carried along the rock shaft 235, until it strikes against a pin 243 and releases the disk 239. Now the rock shaft 235 is free to rotate in the opposite direction under the action of a spring 244 secured thereto whereby the bridge portion 250 is clamped on the paper and the surface of the block 161. It will be understood, that at this moment the paper feeding device 132 has released the paper and begun its stroke to the left, and that also during the same stroke of the rod 100, that is while the paper is clamped by the bridge 250, the punch performs its punching operation. The rock shaft 235 (Fig. 13) is also provided with the cam 66 which engages the rear end of the link 65 by means of which the finger 136 is moved as has been explained above. The drum 122 (Fig. 9) is rotated after the punch has been retracted into its inoperative position and when the feeding device 132 is moving to the left.

In a machine of this class in which the rod 100 (Figs. 5, 7) is unyieldingly connected to its operating mechanism and to the driven mechanisms it is necessary that all the parts are accurately adjusted. This however would be difficult in practice. For this reason I have preferred to provide means whereby the rod 100 is yieldingly connected with the slide 150. The inclination of the guide way 111 (Fig. 2) is such that the arm 110 is rocked at an angle larger than 45 degrees. The slide 150 is connected with a slide 255 (Fig. 6) which has reciprocating movement in a longitudinal slot 256. The slide 255 is made integral with a cylinder 257 which receives an enlarged portion 258 of the rod 100. The said enlarged portion is formed with an elongated transverse slot 259 which is engaged by a pin 260 secured with both ends to the wall of the cylinder 257. A spring 261 interposed between the left hand side face of the cylinder 257 and a collar 262 secured to the rod 100 has the tendency to force the rod 100 to the left and the slide 255 to the right. To the flange 101 an abutment for the slide 150 is secured which in the example shown has the form of a sleeve 263 provided at its operative face with a disk 264 of elastic material. If now the rod 100 (Figs. 4, 5) is shifted to the right by the arm 110 (Fig. 9) which is rocked by the guide 111 (Fig. 2) the slide 150 (Fig. 5) is at first taken along by the spring 261 (Fig. 6) acting on the cylindrical portion 257, until the arm 10 has been rocked at an angle of about 45 degrees more or less, and the cylindrical portion is arrested by the stop 263. Now the rod 100 may continue its stroke, while the slide 150 and the parts associated therewith are arrested in their proper positions.

In describing the operation of the marking apparatus it will be assumed that the arm 110 is just being rocked by the inclined portion of the guide way 111. By such rocking movement the rod 100 and the slide 150 connected therewith are shifted to the right. The pin 155 (Fig. 5) moves to the right; but by reason of the slot 156 it does not act on the paper feeding slide 130 (Fig. 9) until after a certain stroke of the rod 100, which stroke will be sufficient to perform the various functions of other mechanisms. When the pin 155 engages the right hand wall of the slot 156 the paper feeding apparatus 130, 132 is shifted to the right and from the slide 130, the drum 122 is rotated sufficiently to wind up so much of the web of paper as is advanced by the slide 130. It will be understood, that for the present the finger 136 is below the arm 135 and out of the path of the same, so that the paper can be advanced to the extreme right hand end of the stroke of the slide 130. By the same stroke of the slide 150 the slide 180 (Fig. 10) which carries the gluing apparatus is shifted to the left and away from the gluing head 163 the gear 178 being engaged by the rack 179 and the gear wheel 175 engaging in the teeth of the rack 174. By the movement of the slide 180 the gear segment 172 is rocked by its engagement with the stationary rack 173, whereby the cock valves 168 and 169 (Figs. 10, 12) are moved from the position shown in the figures into the positions in which the liquid from the tube has free access to the bore 165 of the gluing head and is closed as against the discharge end. Therefore liquid can pass from the tube 190 (Fig. 8) and through the hose 166, the tube 190 being constantly acted upon by the roller 197 and the spring drum 202. At the end of the stroke of the slide 180 the rocking lever 187 strikes on the screw 179, so that the plunger 165 is pushed outward, and liquid is drawn in from the tube 190 and into the bore 164. At the beginning of the stroke of the rod 100 and while the paper feed slide 130 is still at rest the punch 143 is retracted by the rocking member 223, the shaft 224 and the arm 227, and also the plunger 215 is retracted into the punch by means of the spring 217, the lever 220 being now released from the screw 222. The paper clamping device 230 (Fig. 9) is moved into its inoperative or upper position by means of the gear wheel 241 and the pawl 238 which act in opposition to the spring 244. Therefore the punching apparatus and the paper clamping device are brought into such a position as to permit the feeding of the paper. Furthermore the bar 151 is shifted by its cam 152 in such a way as to move the finger 136 downward and below the arm 135, so that the slide 130 can complete its feeding stroke without striking against the finger 136. At the end of the stroke of the slide 150 the pawl 238 strikes against the pin 243, so as to be retracted from the shoulder 237 and to release the cam shaft 235. Therefore the latter is rocked by its spring 244 and moves the paper clamp 230 into clamping engagement with the block 161. Simultaneously the bar 151 is rocked backward, so that the finger 136 comes into engagement with the arm 135 and rocks the same with the jaw 132 upward and into releasing position in which the arm and jaw are locked by the pawl 137. Therefore the slide 130 can now begin its return stroke without affecting the web of paper.

During the passage of the clamping bar 39 along the guide 111 (Fig. 2) the parts of the punching apparatus are held in the positions into which they have thus been brought by the rocking movement of the arm 110. When the latter arrives at the lower side of the said guide and into clamping engagement with one of the bars 38 provided on the lower chain, the arm 110 is released from the guide 111, so that the bar 100 is thrown backward to the left by the spring 113.

By the movement of the rod 100 (Figs. 4, 6) and the slide 150 to the left the paper feeding apparatus 130, 132 (Fig. 9) which has been brought out of clamping engagement with the web of paper is shifted to the left until at the end of its stroke the pawl 137 strikes against the screw 139, whereby the clamping jaw 132 is thrown into clamping engagement with the paper. The bar 46, the rocker 37 and the pawl 45 are likewise shifted to the left and into position for engagement upon the following stroke of the slide 132 with the ratchet wheel 35 of the paper roll 122. The slide 180 (Fig. 10) which carries the gluing head is shifted to the right and with its head 163 into contact with the paper supported on the face 160 of the block 161 (Fig. 9). By such movement of the slide 180, the cock valves 168 and 169 (Figs. 10, 11) are set in the position shown in the drawings and at the end of the stroke the rocking lever 187 strikes against the screw 188 (Fig. 14). Thereby the plunger 165 (Fig. 10) is forced to the right, and the liquid inclosed within the bore 164 is thrown against the web of paper. The rocker 223 (Fig. 9) is rocked to the left, and the arm 227 mounted on the same shaft therewith is rocked upward. Thereby the punch 143 is thrown upward against the web of paper pressed on the block by means of the clamp 250, and it separates a mark from the said web. Near the end of the upward stroke of the punch the lever 220 strikes against the screw 222, so that the plunger 214 is thrown upward against the mark punched from the web and applies the said mark on the portion of the web of fabric which is clamped between the bar 39 and the coöperating bar 38 of the lower chain. The mark is thus attached or held in contact with the fabric during the travel of the latter through the feeding apparatus, and it is afterward affixed to the fabric by means of the clamping bars 5, 6 as has been explained above. The rocker 239 (Fig. 5) is rocked backward with the pawl 238 into position for engagement with the shoulder 237 of the disk 236. The same operation of the marking apparatus is repeated whenever the arm 110 rides up on the inclined guide 111 and is released thereby.

To permit the web of marking material to be set on the apparatus by hand a crank 86 carrying a handle 88 is secured to the shaft 234 by means of which the clamp 250 can be thrown out of clamping engagement. The roll 122 can be rotated by hand by means of the nut 47 (Figs. 7, 15) secured to the bolt 30.

Having thus described my invention what I claim and desire to secure by Letters Patent is:

1. In an apparatus for measuring webs of fabric, paper, and the like, the combination with chain feeding means exerting a continuous and uniform tension on the web, of an endless tape for guiding the web, and means carried by the chain feeding device for fixing a mark to the web.

2. In an apparatus for measuring webs of fabric, paper, and the like, the combination with a pair of coöperating endless traveling elements having a plurality of coöperating feeding members secured thereto, of rollers on the ends of said feeding members, guides for said rollers, and means for fixing a mark to the fabric forming a part of one of said feeding members.

3. In an apparatus for measuring webs of fabric, paper and the like, the combination with a pair of coöperating endless traveling elements having a plurality of coöperating feeding members secured thereto, of means for fixing a mark to the fabric, forming a part of one of said feeding members, a rocker located on the feeding member which forms a part of the marking device and adapted to operate said marking device, and means to operate said rocker.

4. In an apparatus for measuring fabric, the combination with a pair of coöperating endless traveling elements having a plurality of coöperating feeding members secured thereto, of a marking device forming a part of one of said feeding members, a bar located on the feeding member which forms a part of said marking device and adapted to operate the marking device, a rocker for operating said bar, and means to operate said rocker.

5. In an apparatus for measuring webs of fabric, paper and the like, the combination with a pair of coöperating endless traveling elements having a plurality of coöperating feeding members secured thereto, of a marking device forming a part of one of said feeding members, a bar located on the feeding member which forms a part of the marking device and adapted to operate the marking device, a rocker arranged to operate said bar, a guide member arranged along the path of said rocker and adapted to
5 rock the same into position for preparing the operation of the marking device, and when released by the rocker to throw the marking device into marking position.

ERNST KESSLER.

Witnesses:
SIDNEY RICH,
WM. WASHINGTON BRUNSWICK.